Figure 1A:
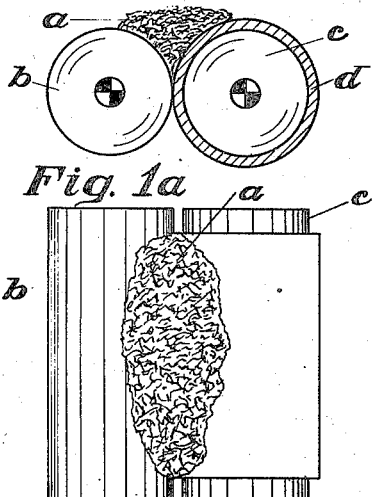
Figure 1B:
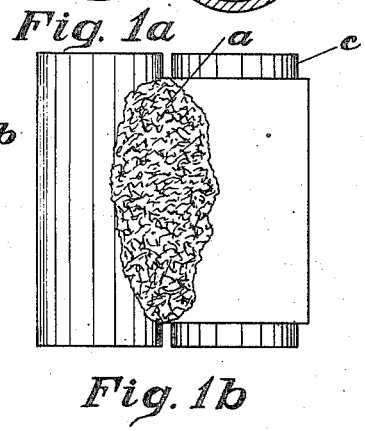
Figure 2A:
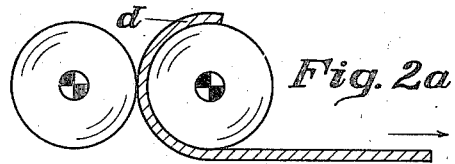
Figure 2B:
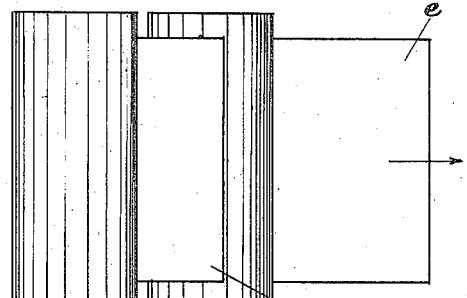

Jan. 5, 1937.　　　　　F. SCHMIDT　　　　　2,067,025
METHOD OF TRANSFORMING POLYMERIZED VINYL CHLORIDE
INTO THIN SHEETS AND PRODUCT OBTAINABLE THEREBY
Filed Nov. 14, 1934

INVENTOR
Fritz Schmidt
BY
ATTORNEY

Patented Jan. 5, 1937

2,067,025

UNITED STATES PATENT OFFICE 2,067,025

METHOD OF TRANSFORMING POLYMERIZED VINYL CHLORIDE INTO THIN SHEETS AND PRODUCT OBTAINABLE THEREBY

Fritz Schmidt, Troisdorf, near Cologne-on-the-Rhine, Germany, assignor to Dynamit-Actien-Gesellschaft, vormals Alfred Nobel & Co., Troisdorf, near Cologne, Germany Application November 14, 1934, Serial No. 752,974
In Germany November 14, 1933

8 Claims. (Cl. 18—57)

In working up plastic masses which consist of polymerization products of vinyl chloride or plastic masses which contain such products, for example subsequently - chlorinated poly - vinyl chloride or mixed polymerizates of vinyl chloride and acrylic acid esters or of vinyl chloride and vinyl acetate, by methods which are customarily used in the celluloid industry, i. e. kneading such masses with solvents, rolling them, pressing them into blocks and cutting off foils from these blocks and drying such foils, one obtains products which show a comparatively great brittleness. Consequently, if such foils are quickly torn, even at room temperature, more especially however, at low temperature, sharp, tooth shaped edges and lateral fissures appear in the torn foils. Also the impact strength of such foils measured in the known manner by a pendulum percussion device is low. These disadvantages are all the more noteworthy, because such foils possess a far better creasing and folding resistance than celluloid and cellulose acetate foils of corresponding strength and their tensile strength is by no means less than that of celluloid and is in fact substantially better than that of cellulose acetate. This brittleness which shows itself in the sharp, uneven tearing of such foils is, therefore, a characteristic of the material which cannot be measured by the last mentioned measuring methods. Only the already mentioned impact strength gives a definite numerical possibility of comparison with regard to the brittleness. However, one can only speak of a certain parallelism between these figures and the above mentioned kind of tearing, insofar as one limits oneself to the investigation of comparative impact strengths of foils of chemically similar substances, whereas even the different degrees of brittleness shown by celluloid and acetyl cellulose foils are in no wise sufficiently characterized by their impact strengths.

However, the lessening of this brittleness in the case of polymerization products obtainable primarily from vinyl chloride is of greatest importance because a brittle material and a material which tears easily and with the formation of rough edges, particularly at low temperatures, will give greater difficulties in working up and will prove itself to be useless for certain very practical purposes. Thus, for example, a material which tears with a tooth-like edge and which splinters cannot be stamped or pulled, or only with great waste, and is not suitable for those operations in which one must reckon with blows, shocks, thrusts and other mechanical requirements, as well as with the influence of low temperatures, for instance, for automobile top windows, safety glass and similar purposes.

It has now been found that one can, to a far reaching extent, lessen the brittleness of polymerization products obtainable primarily from polyvinyl chlorides, particularly foils obtained from subsequently-chlorinated polyvinyl chloride and mixed polymerizates containing polyvinyl chloride, for example, mixed polymerizates of vinyl chloride and acrylic acid esters or of vinyl chloride and vinyl acetate, all of which polymerizates are hereafter generically referred to as "polymerized vinyl chloride", and sometimes even eliminate such brittleness entirely if one rolls out the polymerization products without the use of solvents on heated rollers to form thin rolled sheets and presses the whole sheets between plates either alone or super-imposed under pressure and heat.

Surprisingly, these polymerization products can be easily and smoothly rolled out in a dry state on sufficiently hot rollers to form smooth, thin, rolled sheets of uniform strength, whereas in rolling out dry cellulose derivatives, only very rough, uneven and, for the most part, nodular, incompletely gelatinized and extremely brittle rolled sheets are obtained. By this rolling out the brittleness of the polymerization products perpendicularly to the direction of the rolling is, to a far reaching extent, removed. Thus, if the thin, rolled out sheets which are considerably stretched in one direction when they are pulled off the roller are hotpressed, for example, between nickel plates in the manner customary in polishing celluloid, the thus obtained foils will still tear in a splintering manner in the direction of the pull, but they are extremely tough in a direction perpendicular to the pull and only give on very quick tearing a tooth-edged tear which, however, also extends in the direction of the pull of the rolled out sheets.

The one-sided lessening of the brittleness of the single rolled sheets produced by the above mentioned rolling process is uniformly imparted to the whole composite foil by super-imposing two or more of the mentioned thin rolled sheets, similarly as in wood veneering, perpendicularly or at an angle to the direction of rolling and then pressing under pressure and heat. The angle at which the rolled out sheets are placed one upon another can be chosen at will and one is preferably guided by the number of sheets. Thus two sheets are preferably placed at an angle of 90°, three sheets are preferably placed at an angle of 60° each to the direction of rolling of the single sheets, etc. If these foils, therefore, are torn at room temperature, for example, they show a substantially better torn edge which is without lateral fissures and tooth-like edges.

Instead of placing thin, rolled-out sheets upon each other at an angle in the manner similar to wood veneering and then hot-pressing such sheets together, one can also obtain a similar result by strongly stretching (for example, to about 50 or 100%) a thin, warm rolled-out sheet of the polymerizate at right angles to the direction of the rolling tension and then folding and pressing together this rolled-out sheet alone or in any desired manner with further similarly treated rolled-out sheets under pressure and heat. By stretching the rolled-out sheets at right angles to the direction of the rolling tension and subsequently pressing, one also thus succeeds in obtaining a substantially better and in every respect similar behavior with regard to the tearing of the foils which were formerly characterized by brittleness.

While, as mentioned above, brittleness can be determined only to a limited extent numerically by the impact strength of the material, nevertheless the following data makes it possible to recognize the favorable influence of the new manner of working on the mechanical strength of the material: The impact strength of a foil prepared according to the new process by placing several thin, rolled-out sheets from a mixed polymerizate of vinyl chloride and acrylic acid ester upon each other as described above will be found to be 3–4 times greater than the impact strength of a foil of equal thickness from the same mixed polymerizate which was cut from a block prepared according to the celluloid process while employing solvents. In this case the impact strength of the plate prepared according to the new process is approximately equal in all directions.

Figure 3A:
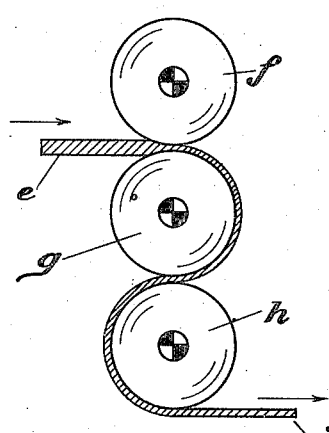
Figure 3B:
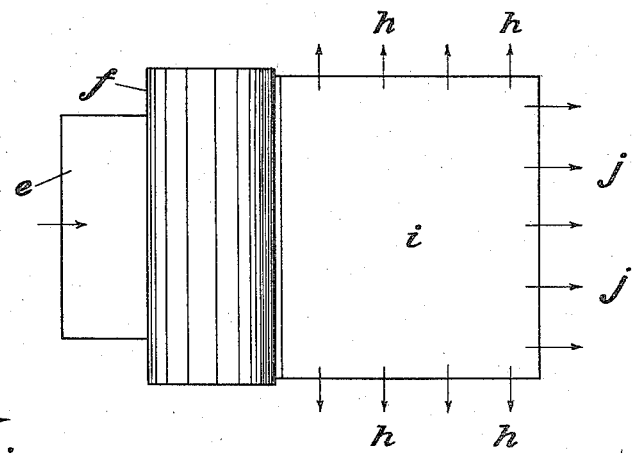
Figure 4:
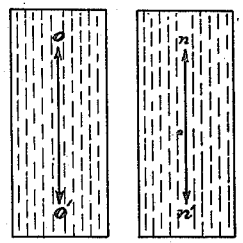
Figure 5:
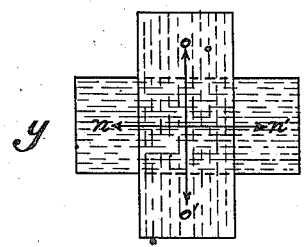
Figure 6:
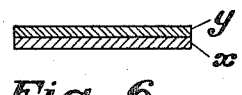

The invention is further illustrated in the accompanying drawing in which Figures 1a, 1b, 2a, and 2b illustrate rolling means for initially transforming a mass of dry polymerized vinyl chloride into a relatively thick sheet; Figures 3a and 3b illustrate rolling means for transforming the relatively thick sheet into a thin sheet; Figure 4 illustrates rectangular strips of such thin sheet; Figure 5 illustrates a composite foil obtained by super-imposing the two strips illustrated in Figure 4 and Figure 6 shows a cross section of the composite foil illustrated in Figure 5. With further reference to the drawing, the dry resin a is first worked between the rolls b and c shown in Figures 1a and 1b so that the resin is "picked up" on the roll c in the form of a cylindrical tube d. The tube d is cut from the roll c in the usual manner and is then flattened out into a rectangular strip e. The strip e is then passed between the pressure rollers f, g, h shown in Figures 3a and 3b and is thereby transformed into a thin sheet i. Tension may be applied at points j on the rolled sheet in the direction of the rolling operation.

As indicated above, such a sheet exhibits oriented tensile properties and its resistance to tear is much greater at right angles to the direction of the rolling operation than it is in a direction parallel to such rolling operation. In Figure 4 x and y represent rectangular strips which have been cut from a rolled sheet such as i. The direction of the rolling operation employed in producing the sheet from which the strips x and y have been taken is indicated by the lines o—o' and n—n' respectively. In order to take full advantage of the oriented properties of the strips x and y, one may be super-imposed upon the other after the manner shown in Figure 5 and a composite sheet can be prepared by joining the contacting parts of the two strips together by means of the application of heat and pressure. After trimming the edges from the composite sheet, the final composite sheet is obtained in the form of a laminated structure whose cross section is illustrated in Figure 6.

Alternately tension may be applied at points j and k at right angles to each other at the time the polymerized vinyl chloride is passed through the rollers f, g, h as illustrated in Figures 3a and 3b. This results in a stretching of the thin sheet of polymerized vinyl chloride in the direction of the rolling operation and in a direction perpendicular to the rolling operation. A sheet so obtained does not exhibit properties which are oriented in a single direction and for this reason such a sheet may be folded several times and the folded portions of the sheet formed into a single laminated structure by the application of heat and pressure. Such a laminated structure will have a high resistance to tearing in every direction and will be far less brittle than a polymerized vinyl chloride structure of the same shape and size which has not been prepared by building up thin sheets of dry rolled polymerized vinyl chloride.

Furthermore, it has been found that the strength of the foils can be increased if at the time the dry material is rolled, small amounts of substances are admixed therewith which substances may be considered as lubricants or as adhesive or binding agents; such substances which can be homogeneously admixed with the polymerizates in their hot-plastic state (for example, on the roller) are, for example, certain substances which are otherwise employed as emulsifying agents, such as, for example, condensation products of ethylene oxide with saturated or unsaturated higher alcohols (octodecyl alcohol, stearyl alcohol, oleyl alcohol), furthermore stearic acid ethanol amide or stearic acid ethanol amide ester, wool fat alcohols, rubber, hydro-rubber, and finally, also certain lubricants of low molecular weight, such as glycerine or glycerine ether alcohol. If one adds, for example, to a mixed polymerizate from vinyl chloride and acrylic acid ester on the hot roller only 1% of one of the above mentioned emulsifying agents, then the tear of a rolled-out sheet thus obtained is substantially better than without such an addition. The effect of lessening the brittleness obtained by such additions to the polymerizates naturally also has the effect that shaped articles which one presses from polymerization with such additions as, for example, combs, will, upon careful examination with respect to their brittleness, show a much lower tendency to break than articles made from polymerizates which have been pressed without such additions.

The effect of such minor additions is all the more astonishing, since the admixing of larger amounts of the customary softening agents will lead to exactly opposite results as may be illustrated, for example, if one adds from 5–10% of phthalic acid dibutyl ester or tributyl phosphate or camphor to the polymerizate. If such softened polymerizates are rolled, the brittleness of foils produced from these masses is substantially greater than that of the pure polymerization products and the impact strength of such foils is reduced to one half.

It is therefore always necessary to roll the polymerization products in the "dry state" which expression means that the polymerizate must not have solvent liquids or large amounts of plasticizing or softening agents incorporated therewith.

I claim:

1. A method of improving the physical properties of polymerized vinyl chloride which comprises rolling dry polymerized vinyl chloride into a thin sheet and stretching the rolled sheet in the direction of the rolling operation and in a direction at right angles thereto by applying tension to the sheet in the said directions and pressing the sheet between plates while applying heat.

2. A laminated composite structure comprising superimposed thin sheets of polymerized vinyl chloride joined together by the application of heat and pressure, said thin sheets being obtainable by rolling dry polymerized vinyl chloride while imparting a stretch thereto in the direction of the said rolling operation and being arranged in such structure in such a way that the direction of the rolling operation resulting in the production of any one sheet is at an angle with the direction of at least one other rolling operation resulting in the production of one other sheet.

3. A method of improving the tensile strength and reducing the brittleness of polymerized vinyl chloride which comprises rolling dry polymerized vinyl chloride into a thin sheet and pressing the sheet between plates under heat.

4. A method of improving the physical properties of polymerized vinyl chloride which comprises rolling dry polymerized vinyl chloride into a thin sheet and stretching the rolled sheet in a direction at right angles to the direction of the rolling operation by applying tension to the sheet in the said directions and pressing the sheet between plates while applying heat.

5. A method of improving the physical properties of polymerized vinyl chloride which comprises rolling dry polymerized vinyl chloride into a thin sheet, super-imposing at least two of the said sheets at an angle with the direction of the rolling operation between plates and pressing under heat.

6. A laminated composite structure comprising superimposed thin sheets of polymerized vinyl chloride joined together by the application of heat and pressure, said thin sheets being obtainable by rolling dry polymerized vinyl chloride and being arranged in such structure in such a way that the direction of the rolling operation resulting in the production of any one sheet is at an angle with the direction of at least one other rolling operation resulting in the production of one other sheet.

7. A thin sheet of polymerized vinyl chloride of high flexibility and tensil strength substantially as is obtainable by rolling dry polymerized vinyl chloride into a thin sheet and thereafter pressing the sheet between plates under heat.

8. A thin sheet of polymerized vinyl chloride of high flexibility and tensil strength substantially as is obtainable by rolling dry polymerized vinyl chloride into a thin sheet and stretching the rolled sheet in a direction at right angles to the direction of the rolling operation by applying tension to the sheet in the said directions and pressing the sheet between plates while applying heat.

FRITZ SCHMIDT.